United States Patent
Pines et al.

(10) Patent No.: US 7,341,011 B2
(45) Date of Patent: Mar. 11, 2008

(54) CHILD CAR SEAT COVER

(75) Inventors: Jennifer Bari Pines, Atlanta, GA (US); Rebecca Coffsky Bernath, Sandy Springs, GA (US)

(73) Assignee: Emmalu, LLC, Atlanta, GA (US)

( * ) Notice: Subject to any disclaimer, the term of this patent is extended or adjusted under 35 U.S.C. 154(b) by 144 days.

(21) Appl. No.: 11/251,731

(22) Filed: Oct. 17, 2005

(65) Prior Publication Data

US 2007/0085391 A1    Apr. 19, 2007

(51) Int. Cl.
*D05B 13/00* (2006.01)
*A41C 31/11* (2006.01)
*B65D 65/08* (2006.01)
*D05B 23/00* (2006.01)
*A47C 31/00* (2006.01)
*B65D 65/00* (2006.01)

(52) U.S. Cl. .......................... 112/475.08; 297/219.12; 150/154

(58) Field of Classification Search ........... 112/475.01, 112/475.08, 475.14, 413, 10, 470.27; 297/218.1, 297/218.4, 219.12, 224, 228.11; 150/154, 150/158
See application file for complete search history.

(56) References Cited

U.S. PATENT DOCUMENTS

| 4,478,453 | A |  | 10/1984 | Schutz |
| 4,621,004 | A |  | 11/1986 | Madsen |
| 4,761,032 | A |  | 8/1988 | Sanchez et al. |
| 4,883,701 | A |  | 11/1989 | Rankin et al. |
| 4,891,454 | A |  | 1/1990 | Perdelwitz, Jr. et al. |
| 4,892,769 | A |  | 1/1990 | Perdelwitz, Jr. et al. |
| 4,946,221 | A |  | 8/1990 | Livingston |
| 4,993,090 | A |  | 2/1991 | Ranalli |
| 5,099,532 | A | * | 3/1992 | Thomas et al. ................ 5/484 |
| 5,611,095 | A | * | 3/1997 | Schneider ...................... 5/482 |
| 5,735,576 | A | * | 4/1998 | Pepys et al. ................ 297/397 |
| 5,950,261 | A | * | 9/1999 | Hay et al. ....................... 5/482 |
| 5,988,744 | A | * | 11/1999 | Franchak ............... 297/256.17 |
| 6,056,355 | A |  | 5/2000 | Klassen |
| 6,274,520 | B1 | * | 8/2001 | Cordell ....................... 442/381 |
| 6,394,543 | B1 |  | 5/2002 | Dunne et al. |
| 6,764,134 | B1 | * | 7/2004 | Crescenzi et al. ..... 297/219.12 |
| 6,926,359 | B2 | * | 8/2005 | Runk .................... 297/219.12 |
| 7,192,086 | B2 | * | 3/2007 | Davis et al. ........... 297/219.12 |
| 2003/0215600 | A1 |  | 11/2003 | Ammons |
| 2005/0110315 | A1 |  | 5/2005 | Littlehorn et al. |

* cited by examiner

*Primary Examiner*—Ismael Izaguirre
(74) *Attorney, Agent, or Firm*—George R. Reardon

(57) ABSTRACT

A child car seat cover is disclosed. This device provides an easily removable, cleanable and adjustable cover for a child car seat that restricts the passage of food, dirt and liquids to the car seat material. The device is comprised of multiple layers of fabric, strap covers, strap openings and strap closures.

1 Claim, 8 Drawing Sheets

CHILD CAR SEAT COVER

FIELD OF THE INVENTION

The present invention relates to child car seat covers. Specifically, the present invention relates to child car seat covers that can easily be removed from the car seat and cleaned.

BACKGROUND OF THE INVENTION

Children frequently soil while in their car seat, i.e., spill, wet, vomit. Historically, if the car seat material on which the child rests gets wet or dirty because of soiling, one has to remove the entire car seat from the car and take the car seat apart in order to remove the car seat material to wash it. This process takes several minutes and one is left without a functional car seat until the car seat material is washed, dried, and put back on the car seat, and the car seat is then put back in the car.

Additionally, existing aftermarket car seat covers generally have at least one of the following other problems:

A gap where the straps pull through, which allows food, dirt and liquid to get through and dirty the car seat material. When these crumbs, particles and liquids dirty the car seat material one still has to take out the car seat from the vehicle and remove both the aftermarket car seat cover and the car seat material for cleaning.

Exposed straps. This poses a problem when the child soils the straps with liquids, food or vomit.

Having to take off the bottom part of the cover in order to tighten the harness strap. This poses a problem when one needs to adjust the harness straps, which is generally every time one puts a child in the seat.

These and other problems exist. Previous attempts to solve these and other problems include the following.

U.S. Pat. No. 4,478,453, issued to Bernard R. Schutz on Oct. 23, 1984 discloses an adjustable cover for an infant car seat, having front and rear sections with fastening straps and an elastic securing strip.

U.S. Pat. No. 4,621,004, issued to Laurie Madsen on Nov. 4, 1986, discloses a disposable liner for a car seat comprised of absorbent composite material with a rectangular body and L shaped side members.

U.S. Pat. No. 4,761,032, issued to Florence J. Sanchez and David L. Sanchez on Aug. 2, 1988, discloses a cover for an infant seat having a rolled blanket and a protective hood attached to the ends of the cover pad and place-able over an infant seat.

U.S. Pat. No. 4,883,701, issued to Janice J. Rankin and Marilyn M. Pearson on Nov. 28, 1989, discloses an infant car seat liner with shoulder strap and leg receiving slots for fitting the infant seat liner to an infant car seat.

U.S. Pat. No. 4,891,454, issued to Lee E. Perdelwitz, Jr. and David E. Hanke on Jan. 2, 1990, discloses an infant car seat liner with strap-receiving slots selectively operable and optionally being perforated.

U.S. Pat. No. 4,892,769, issued to Lee E. Perdelwitz, Jr., Paul G. Gaddis, Ron H. Iff, Michael E. Cotie and Amar N. Neogi on Jan. 9, 1990, discloses a fire resistant infant seat liner made of a thermo-bonded material with a resistant component giving a low flame propagation rate.

U.S. Pat. No. 4,946,221, issued to Isabel C. Livingston on Aug. 7, 1990, discloses an infant seat cover comprised of a water-repellent cover which extends loosely and continuously over the entire seat except for the central face opening.

U.S. Pat. No. 4,993,090, issued to Tracey L Ranalli on Feb. 19, 1991, discloses a baby blanket for a car seat, having multiple apertures through which a restraining harness passes.

U.S. Pat. No. 6,056,355, issued to Elizabeth a. Klassen. on May 2, 2000, discloses a cover for a child's car seat comprised of a fabric hood with an elasticized hem and an access flap with a meshed opening.

U.S. Pat. No. 6,394,543, issued to Debra Dunne and Laura Hastings on May 28, 2002, discloses a covering for a children's car seat, having a divided opening in the main body portion for passage of harness straps and blanket flap portions which can be folded over the child's body.

U.S. Patent Publication 2003/0215600, inventor Caron Ammons, published on November 2003 discloses a removable protector for a child seat comprised of a sheet of porous material, a sheet of absorptive material and a sheet of non-porous material.

U.S. Patent Publication 2005/0110315, inventors Sheila Littlehorn and Nancy Bartley, published on May 26, 2005, discloses a removable car seat cover having a border portion disposed about the outer periphery of the fabric cover to secure the cover about a car seat, with the car seat cover being disposed between a child and the car seat.

While these patents and other previous methods have attempted to solve the above mentioned problems, none have addressed facilitating cleaning after soiling, protecting the straps, closing the strap gap and facilitating harness tightening.

Therefore, a need exists for an improved child car seat cover that incorporates solutions to these problems.

The foregoing patent and other information reflect the state of the art of which the inventor is aware and are tendered with a view toward discharging the inventor's acknowledged duty of candor in disclosing information that may be pertinent to the patentability of the present invention. It is respectfully stipulated, however, that the foregoing patent and other information do not teach or render obvious, singly or when considered in combination, the inventors' claimed invention.

BRIEF SUMMARY OF THE INVENTION

The general purpose of the present invention, which will be described subsequently in greater detail, is to provide a child car seat cover that provides a measure of protection against soiling of the car seat, is easily removable from the car seat, and is washable.

In particular, the present invention solves the above-mentioned problem of cleaning a soiled child car seat cover. The present invention easily goes on over a car seat. The present invention is waterproof and keeps the car seat material clean. The present invention is easily removable when it gets dirty. Because of a waterproof material layer, one's car seat remains functional when the present invention is soiled and removed.

The present invention is comprised of at least three layers: a top absorbent layer, a middle soaker layer and a third waterproof backing layer. The top absorbent layer is made of a fabric that has been made flame retardant, e.g., cotton, cotton/poly blend, polyester. The middle soaker layer is made of a material especially designed for absorbing liquids, such as the materials used in diapers. The waterproof backing layer is made a waterproof material, e.g., nylon, polyurethane laminate or vinyl. This layered construction allows liquid that seeps through the top layer to be absorbed into the soaker layer and then to stop penetrating at the waterproof backing layer. The present invention is further comprised of openings for straps and closures, e.g. snaps, hook-and-loop fasteners, closing off any extra space where the straps pull through. This prevents any liquid and/or food from soiling the original car seat. The present invention is further comprised of coverings for the child car seat straps. These strap covers are easily removable, secured on by snaps, Velcro®, or the like. The strap covers allow for harness adjustment. The present invention allows for easy loosening and/or tightening of the car-seat straps by having an opening, e.g. slit, for the strap to come through.

One advantage of the present invention is that it is easily removed from the child car seat.

Another advantage of the present invention is that it is easy to clean.

Another advantage of the present invention is that it provides protection from soiling for a child car seat.

Another advantage of the present invention is that is provides for tightening of the harness strap without removing the child car seat cover.

Another advantage of the present invention is that is can be made from inexpensive and easy to obtain materials.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The above summary of the present invention is not intended to describe each illustrated embodiment or every implementation of the present invention. The figures and detailed description that follow more particularly exemplify these embodiments.

BRIEF DESCRIPTION OF THE SEVERAL VIEWS OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

In the following description, numerous specific details are set forth in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

Figure 1:
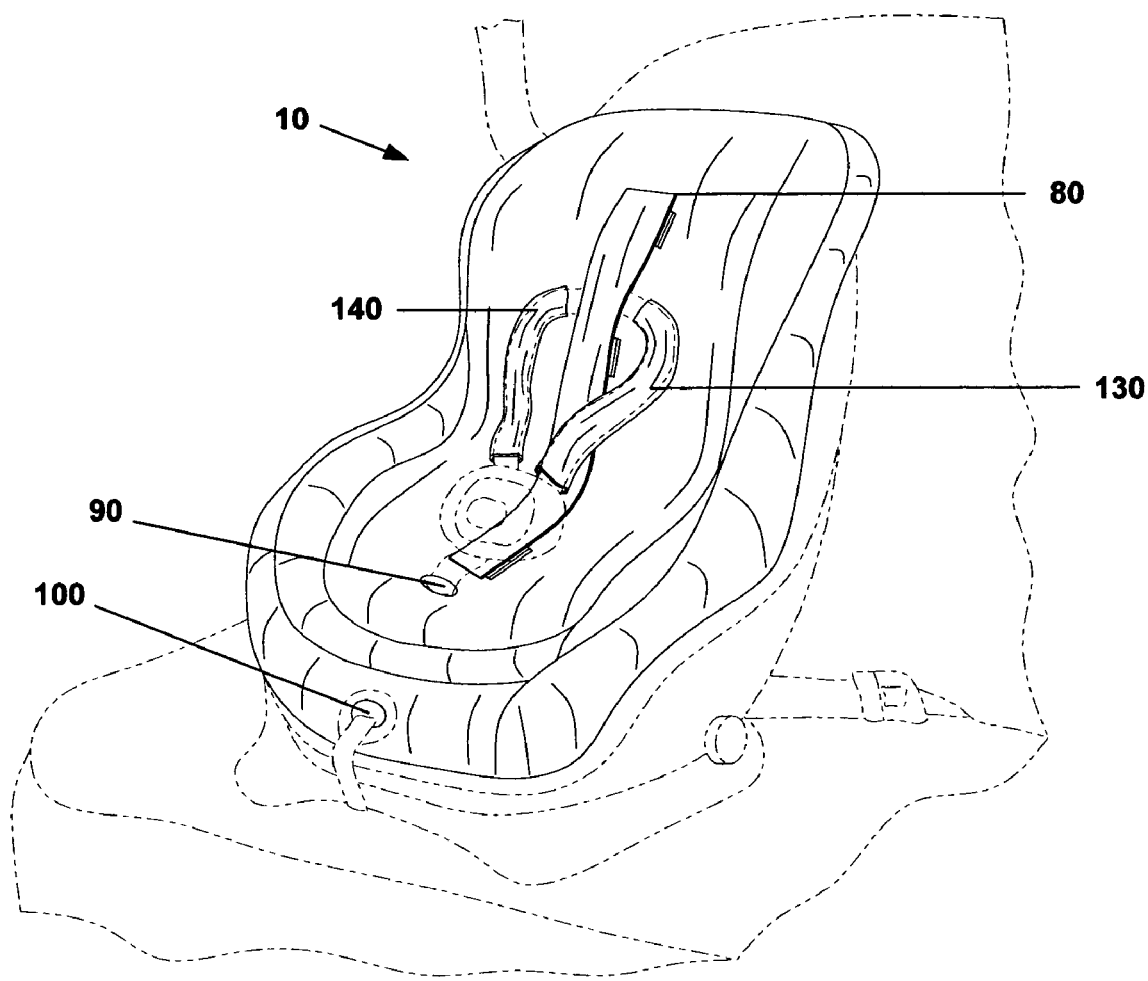
FIG. 1 is a perspective view which illustrates a child car seat cover fitted over a traditional child car seat according to an embodiment of the present invention.

Referring now to FIG. 1, car seat cover 10 is illustrated. Strap opening 80 is positioned to permit the passage of the child car seat belt from the child car seat through car seat cover 10. Left strap cover 130 is placed over the left harness strap and closed using one or more of harness strap strap-closure 160 (not shown) and right strap cover 140 is placed over the right harness strap and closed using one or more of harness strap strap-closure 160 (not shown). Buckle strap opening 90 is positioned to permit passage of the child car seat buckle strap. Strap tightening opening 100 is positioned to facilitate the tightening of the harness straps.

Figure 2:
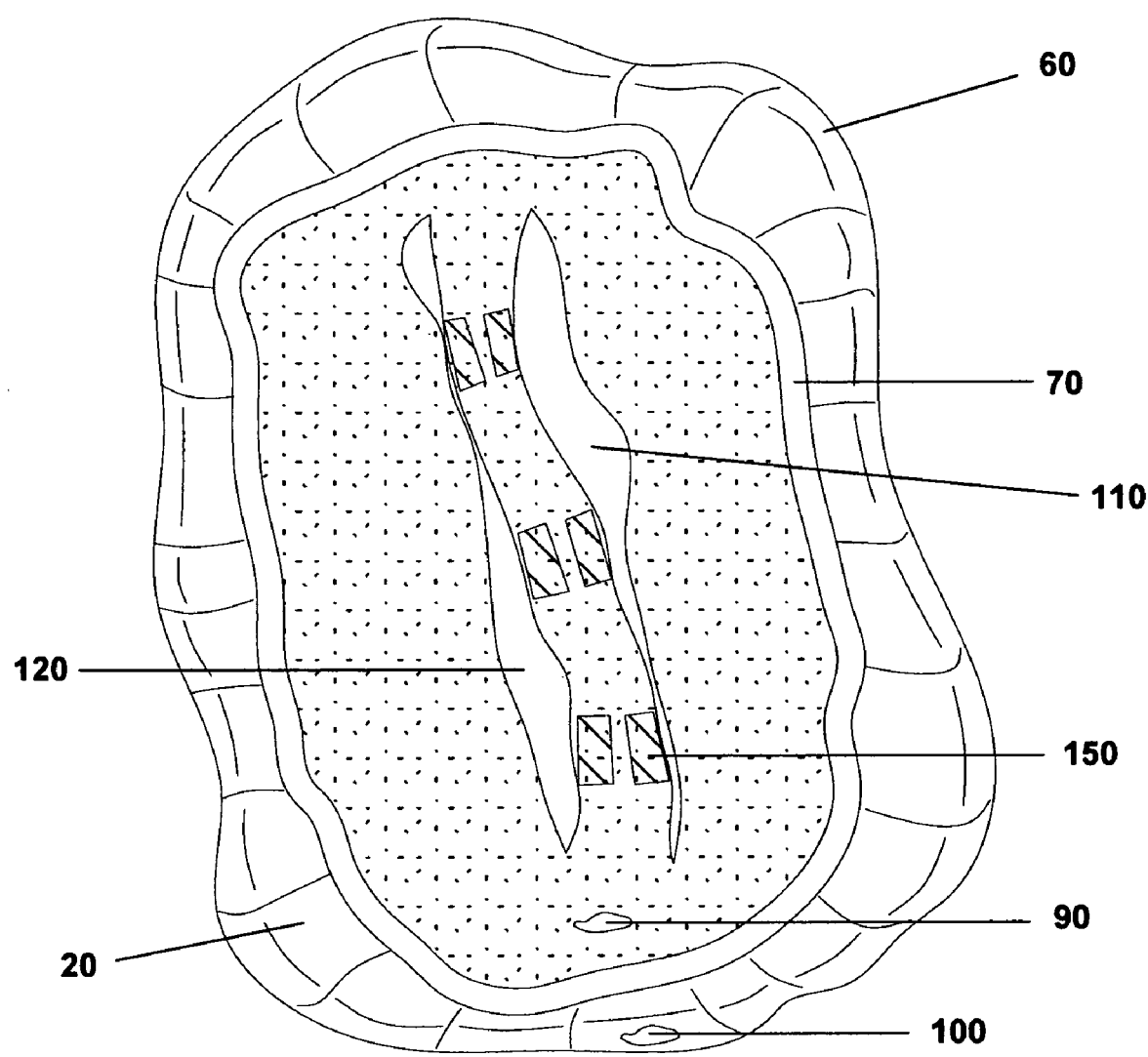
FIG. 2 is a back side plan view of a child car seat cover according to an embodiment of the present invention.

Referring now to FIG. 2, left harness strap opening 110 and right harness strap opening 120 are positioned to allow the harness straps passage. A plurality of harness strap opening-closure 150 is positioned roughly as shown in order to close the openings so to restrict passage of particles of food and dirt. Buckle strap opening 90 is positioned roughly as shown, as is strap tightening opening 100. Elastic band 70 is positioned at the periphery of the child car seat cover in order to facilitate the easy installation and removal of the car seat. Once the child car seat cover is installed outer layer border 60 is roughly positioned on the back periphery of a child car seat.

Figure 3:
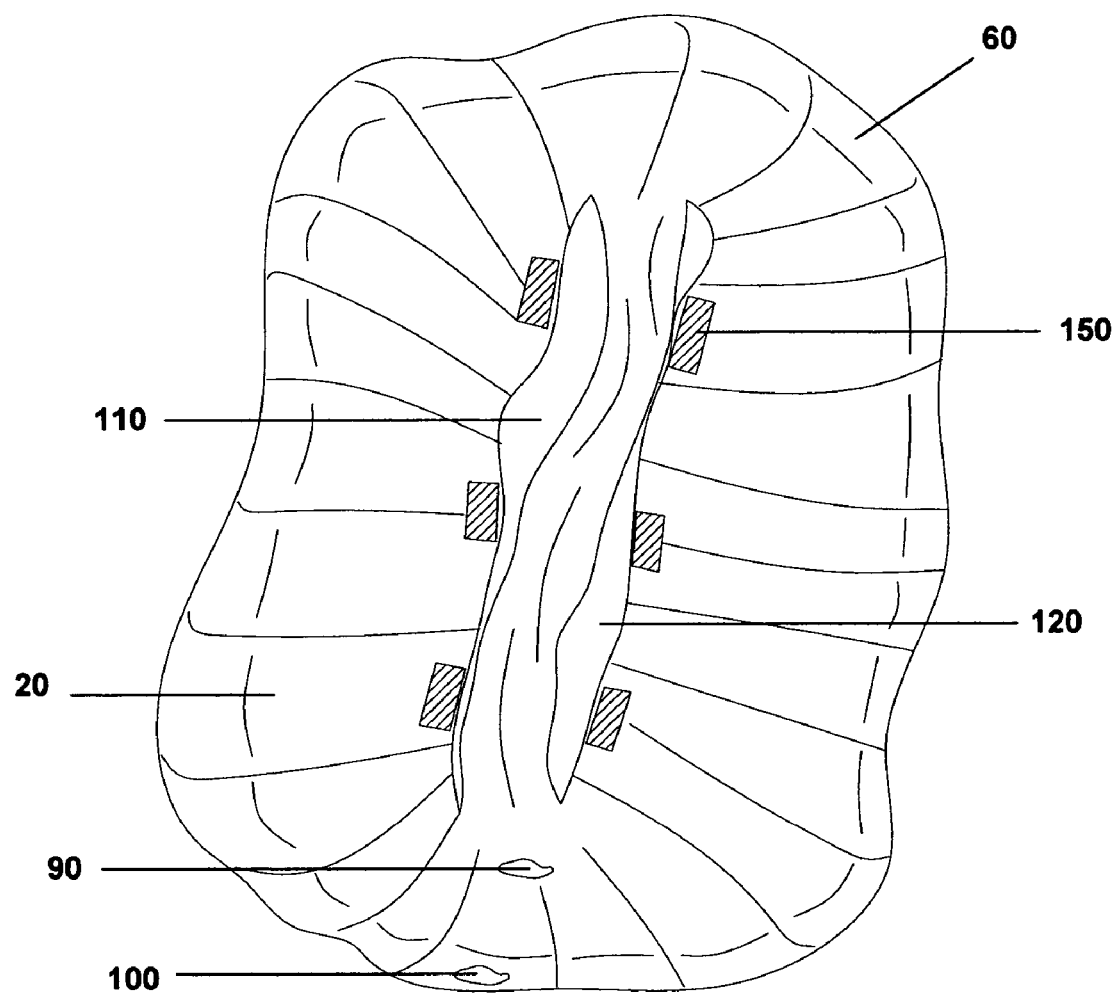
FIG. 3 is a front side plan view of a child car seat cover according to an embodiment of the present invention.

Referring now to FIG. 3, bottom layer 20 is shown. Outer layer 60, buckle strap opening 90, strap tightening opening 100, left harness strap opening 110, right harness strap opening 120 and harness strap opening-closure 150 are also illustrated.

Figure 4:
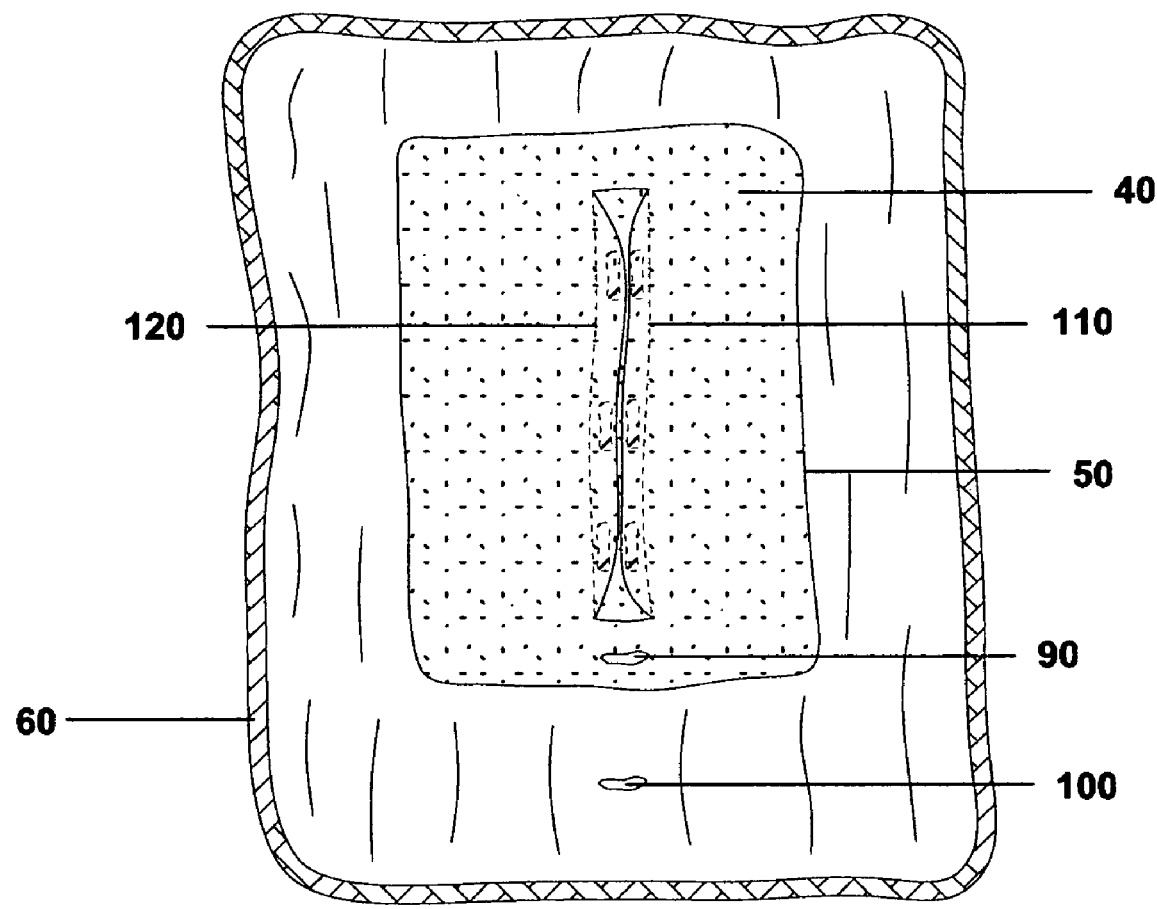
FIG. 4 is a front side plan view of a child car seat cover with the elastic removed so it can be laid flat according to an embodiment of the present invention.

Referring now to FIG. 4, the elastic band and the bottom layer have been removed in order to lay the remaining assembly flat for illustrative purposes, showing multiple-layer area 50 and middle area 40. Outer layer border 60, buckle strap opening 90, strap tightening opening 100, left harness strap opening 110, right harness strap opening 120 are also illustrated to show their relative positions and dimensions.

Figure 5:
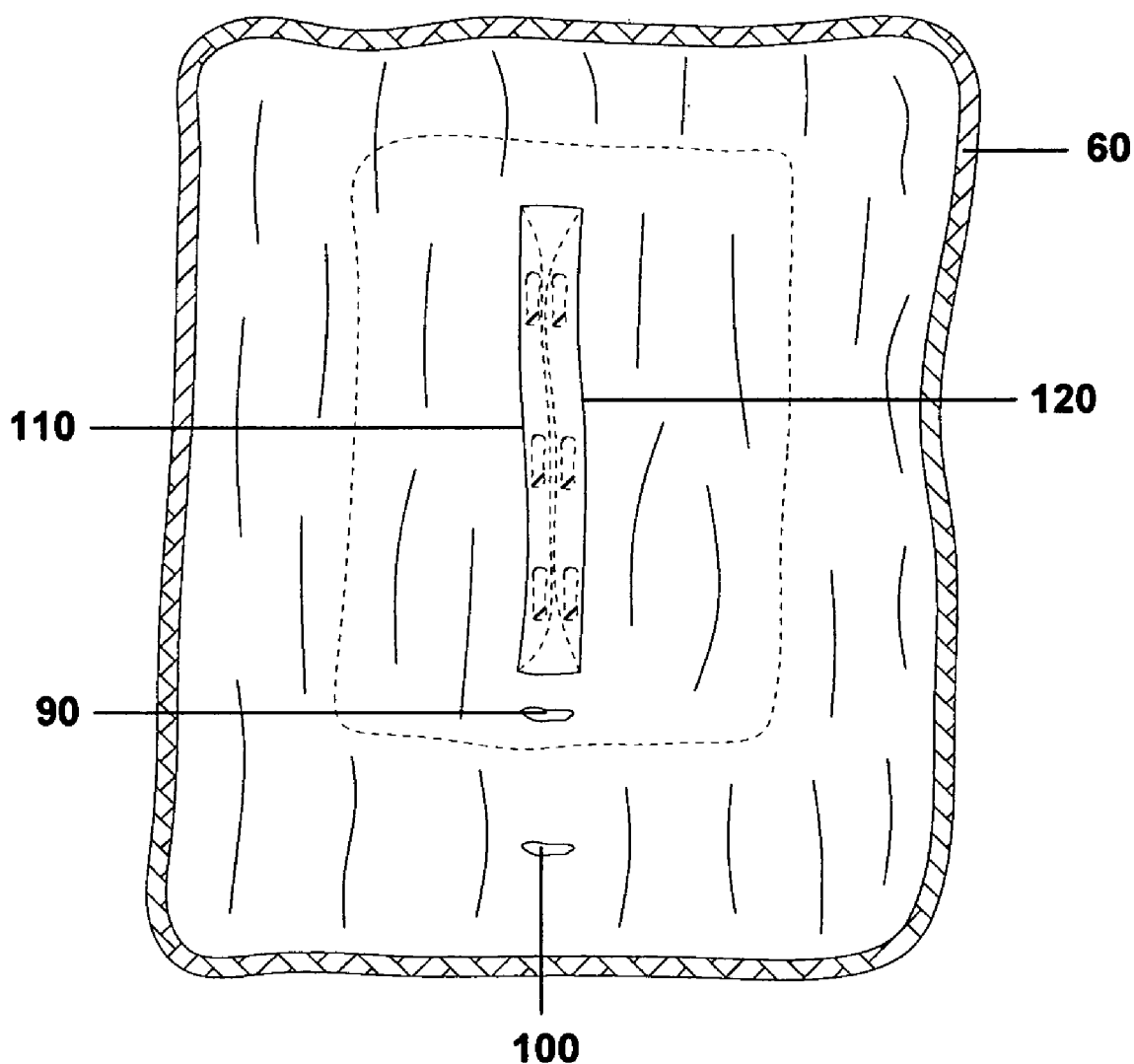
FIG. 5 is a back side plan view of a child car seat cover with the elastic removed so it can be laid flat according to an embodiment of the present invention.

Referring now to FIG. 5, the elastic band and the bottom layer have been removed in order to lay the remaining assembly flat for illustrative purposes, illustrating outer layer border 60, buckle strap opening 90, strap tightening opening 100, left harness strap opening 110 and right harness strap opening 120.

Figure 6:
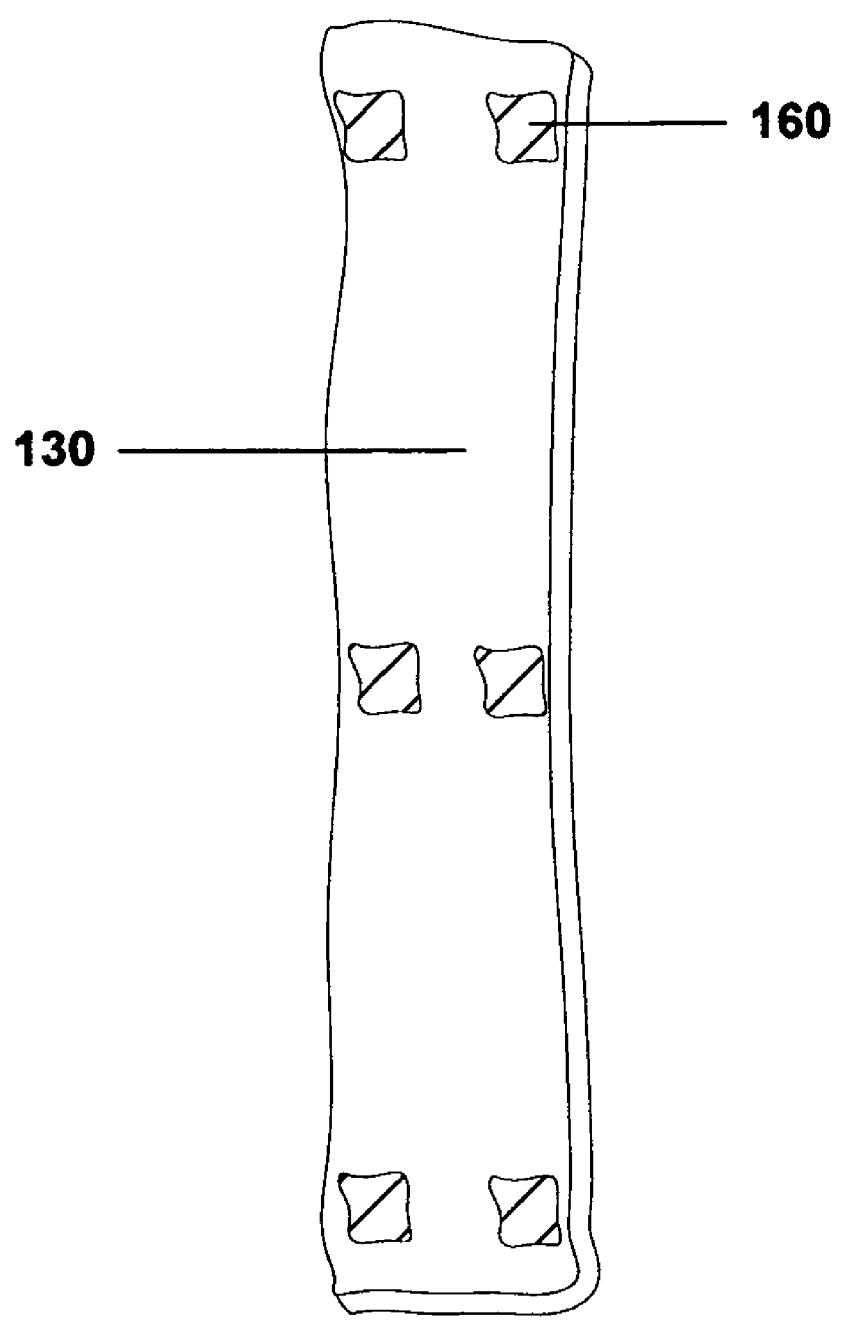
FIG. 6 is a plan view of a strap covering in the open position for a child car seat cover according to an embodiment of the present invention.

Referring now to FIG. 6, left strap cover 130 is shown in the open position, with a plurality of harness strap strap-closure 160.

Figure 7:
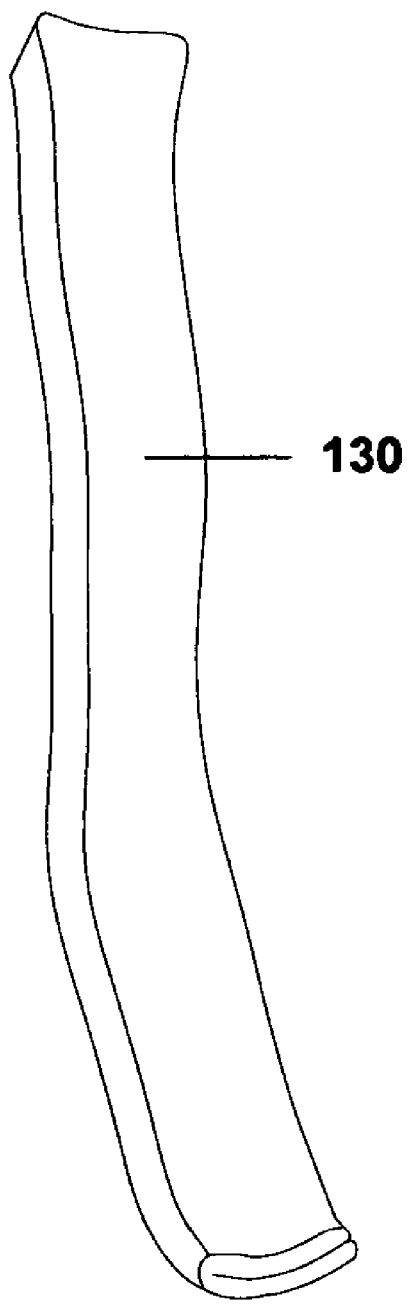
FIG. 7 is a perspective view of a strap covering in the closed position for a child car seat cover according to an embodiment of the present invention.

Referring now to FIG. 7, left strap cover 130 is shown in the closed position by putting the harness strap strap-closures in contact with each other.

Figure 8:
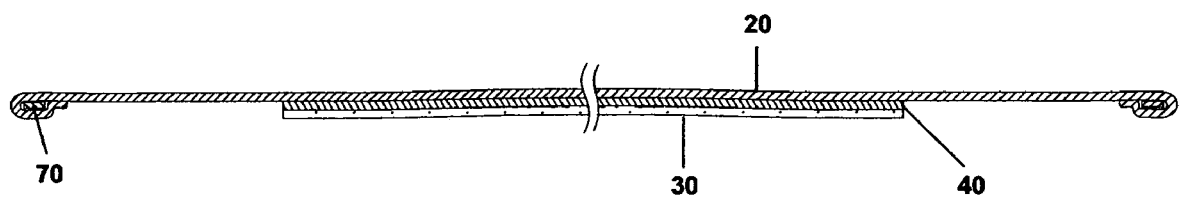
FIG. 8 is a cross-sectional view of a child car seat cover showing the layered construction according to an embodiment of the present invention.

Referring now to FIG. 8, the multiple-layer area is shown in cross-section, illustrating the relationship and positioning of bottom layer 20, middle layer 40 and top layer 30. The arrangement of this assembly allows liquids to pass through bottom layer 20, to be absorbed by the soaking material of middle layer 40 and then to stop at the liquid barrier formed by top layer 30. The positioning of elastic band 70 is also illustrated.

One method of making the present invention is to:
Acquire an absorbent fabric, a soaker fabric and waterproof fabric
Cut a large piece of the absorbent fabric for the outer layer
Cut the soaker fabric in roughly the same size as the outer layer to form the soaker layer
Cut the waterproof fabric in roughly the same size as the outer layer and soaker layer to form the waterproof backer
Join the soaker layer and waterproof backer to the outer layer by sewing
Cut slits in an appropriate length and position for the child car seat straps
Sew in industrial strength Velcro® pieces to the slits and middle section in order to enable the closing of the gap around the straps in order to prevent items from soiling the car seat
Cut two additional side pieces of the material used for the outer fabric. One piece is attached per side to enable the cover to wrap around the car seat
Sew a ¾" elastic around the perimeter of the cover with double reinforced seams
Cut a smaller hole in appropriate position to allow for the buckle strap
Sew approximately a ¼" elastic around the hole to allow it to conform around the buckle strap
Cut another hole below the first hole in the appropriate position to allow for the tightening strap to pull through
Sew a ¼" elastic around hole to allow it to conform around the tightening strap
Cut two pieces of outer layer fabric, the soaker layer and the waterproof backer roughly 5"×16"
Sew all of the fabrics together, with edges trim and neat
Sew industrial strength Velcro® pieces along the outer inside edge to secure the edges when folded over.

Indicia used in describing the present invention is as follows:

| Number | Description |
|---|---|
| 10 | Car Seat Cover |
| 20 | Bottom Layer |
| 30 | Top Layer |
| 40 | Middle Layer |
| 50 | Multiple-Layer Area |
| 60 | Outer Layer Border |
| 70 | Elastic Band |
| 80 | Strap Opening |
| 90 | Buckle Strap Opening |
| 100 | Strap Tightening Opening |
| 110 | Left Harness Strap Opening |
| 120 | Right Harness Strap Opening |
| 130 | Left Strap Cover |
| 140 | Right Strap Cover |
| 150 | Harness Strap Opening Closure |
| 160 | Harness Strap Strap-Closure |

What is claimed is:

1. A method for making a child car seat cover comprising:
acquiring an absorbent fabric, a soaker fabric and waterproof fabric;
cutting a large piece of said absorbent fabric to form an outer layer;
cutting said soaker fabric in roughly the same size as said outer layer to form a soaker layer;
cutting said waterproof fabric in roughly the same size as said outer layer and said soaker layer to form a waterproof backer;
joining said soaker layer and said waterproof backer to said outer layer by sewing;
cutting slits in an appropriate length and position for child car seat straps;
sewing in industrial strength hook-and-loop pieces to said slits and middle section in order to enable the closing of the gap around the straps;
cutting two additional side pieces of said absorbent material used for said outer fabric;
attaching one piece per side to enable the cover to wrap around the car seat;
sewing an elastic around the perimeter of the cover with double reinforced seams;
cutting a first hole in appropriate position to allow for the buckle strap;
sewing approximately a ¼" elastic around the hole to allow it to conform around a buckle strap;
cutting a second hole below said first hole in the appropriate position to allow for a tightening strap to pull through;
sewing a ¼" elastic around said second hole to allow said second hold to conform around said tightening strap;
cutting two pieces of said outer layer fabric, said soaker layer and said waterproof backer, dimensioned to roughly 5"×16";
sewing all of the fabrics together, with edges trim and neat; and
sewing industrial strength hook-and-loop pieces along the outer inside edge to secure the edges when folded over.

\* \* \* \* \*